Patented Aug. 2, 1927.

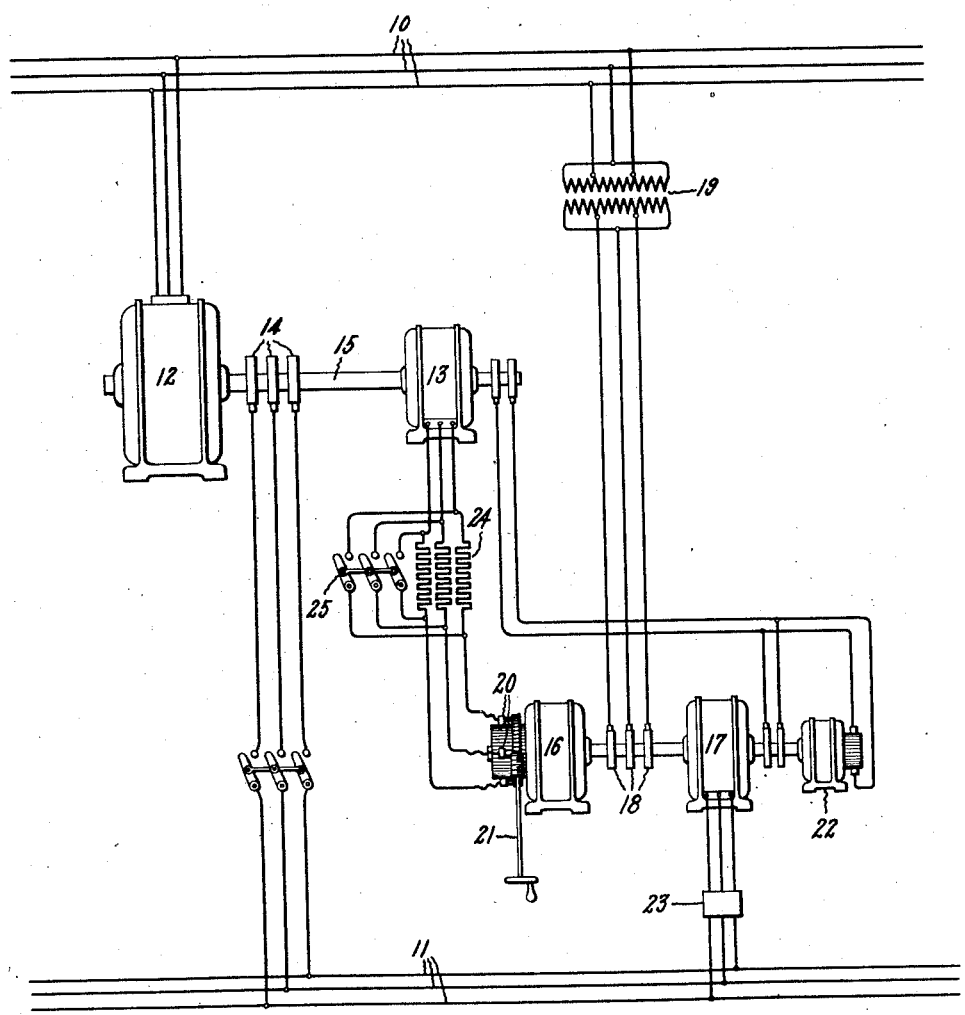

1,637,863

UNITED STATES PATENT OFFICE.

GEORGE H. JUMP, OF BUFFALO, NEW YORK, ASSIGNOR TO GENERAL ELECTRIC COMPANY, A CORPORATION OF NEW YORK.

FREQUENCY CHANGER.

Application filed March 18, 1925. Serial No. 16,551.

My invention relates to frequency changers and regulating apparatus therefor. It often times becomes desirable to interchange power in either direction and in variable amounts between different alternatng current power systems of the same or nearly the same frequency. Often times the amount of power which it is desired to transfer between the different power systems is more or less than that required to hold the systems in a fixed frequency relation, and, as a consequence, there exists no definite fixed frequency relation between the two systems, such as would permit of them being tied together by apparatus requiring a fixed frequency relation, but, on the other hand, the frequency of one system may vary from time to time with respect to the frequency of the other system.

My invention relates to apparatus particularly designed to meet this kind of a problem. In carrying my invention into effect, I provide a variable frequency transformer between the two systems consisting of an induction type dynamo electric machine with coil wound windings on primary and secondary, together with regulating apparatus for adjusting the direction and extent of load transfer, which apparatus automatically adjusts itself to take care of any variation in the frequency relation existing between the two interconnected systems and permits such frequency variation.

The features of my invention which are believed to be novel and patentable will be pointed out in the claims appended hereto. For a better understanding of my invention reference is made in the following description to the accompanying drawing which illustrates one arrangement of the frequency changer and the regulating apparatus by means of which my invention may be carried into effect.

In the drawing, I have represented a polyphase power system 10 assumed to be a 62½ cycle system and a second polyphase power system 11 assumed to be a 60 cycle system. Under operating conditions found in practice, the frequency on either systems may vary a few per cent. The function which my invention is intended to perform is a transfer of a controllable amount of power in either direction between the two systems without regard to a variation in the frequency relations. For this purpose, I provide a frequency changer set comprising machines 12 and 13. Machine 12 is an induction type dynamo electric machine having its stator winding connected to system 10 and its form wound rotor winding connected to system 11 through slip rings 14. The machine 13 is a synchronous machine having its rotor mounted on the shaft 15 with the rotor of machine 12. Machine 12 will rotate at a speed having the same ratio to the synchronous speed of the machine as that of the difference in frequencies between the two systems to the frequency of the lower frequency system, assuming the synchronous speed of the machine is based on the frequency of the lower frequency system. Thus, if machine 12 is a four pole machine its synchronous speed at 60 cycles would be 1800 revolutions per minute. If system 10 is operating at 63.8 cycles and system 11 at 60 cycles, the difference in frequency is 3.8 cycles and machine 12 will operate at 114 revolutions per minute. If both power systems are operating at exactly the same frequency the machine will be at standstill and will then operate as an ordinary three phase transformer. The direction and extent of load transfer under either of these conditions will depend upon the direction and extent of the phase angle adjustment between the stator flux and rotor flux of machine 12. The function of machine 13 and the regulating apparatus associated therewith is to control this phase angle adjustment irrespective of variations in the frequency relation between the two power systems and to produce the mechanical torque necessary to the desired flux relation in machine 12. To accomplish this adjustment it will appear that machine 13 must act either as a motor or a generator, depending on the direction of torque and rotation, with a mechanical load transfer between machines 12 and 13 and that the stator winding of machine 13 must be connected to an alternating current system having a frequency proportional to the difference between that of the two power systems from which or to which machine 13 may draw or supply energy.

In the drawing the stator winding of synchronous machine 13 is connected to the commutator of an alternating current exciter 16 which is driven by a synchronous machine 17. The exciter 16 receives its excitation from one of the two systems and the synchronous machine 17 is connected to the other system. In the present case, machine 16 is similar in principle to the ordinary ohmic drop exciter. The rotor winding is connected through slip rings 18 and a transformer 19 to system 10. Since the exciter 16 is driven by machine 17 at a speed proportional to the frequency of system 11 and the exciter receives excitation from system 10, the frequency delivered at its commutator will be proportional to the difference between the frequencies of systems 10 and 11. The pole numbers of the various machines are selected to make the frequencies of synchronous machine 13 and that of the commutator end of exciter 16 equal.

The other essential feature of my invention is means for adjusting the phase angular relation betwen the two windings of machine 12. A convenient way to accomplish this is by adjusting the position of the brushes 20 of exciter 16 and I have represented manually operated means 21 for doing this. This phase angle adjustment may also be accomplished by suitably arranged taps on transformer 19. The adjustment of the brushes 20 varies the phase angle of the excitation supplied to machine 13 which in turn varies the angular space position of its rotor and also that of the rotor of machine 12, with consequent variation of the angular relationship of the stator and rotor fluxes in machine 12. For direct connection between machines 12 and 13 these two machines should have the same number of poles, in which case machines 16 and 17 should have the same number of poles. An exciter 22 is provided for furnishing direct current excitation to synchronous machines 13 and 17. Synchronous machines 13 and 17 are available for power factor correction on both systems. The machine 17 is preferably provided with starting means represented at 23 and a starting resistance is also represented at 24 for the main set. A switch 25 is represented for short circuiting the resistance 24 during normal operation. Line switches and transformers will be provided wherever necessary in accordance with the usual practice.

With the apparatus in operation, if it is desirable to transfer power from system 10 to system 11, the brushes 20 are adjusted to cause machine 13 to act as a generator. This adjusts the space angular position of the rotating parts of machines 12 and 13 to cause the rotor of machine 12 to function as a secondary transformer element at the same time this machine acts as a motor to drive machine 13. Part of the load is transferred by transformer action between the windings of machine 12 and part of the load is mechanically conveyed to machine 13 by motor action. The last mentioned part of the load is in turn transferred through machines 16 and transformer 19 back to system 10. The energy which circulates from system 10 through the frequency changer apparatus is only a small part of the total. It is theoretically equal to the difference between the frequencies of the two systems divided by the frequency of the lower system times the power flowing to or from this system.

The synchronous motor 17 serves only to drive the exciters 16 and 22. To transfer load from system 11 to system 10, the phase angle adjustment is made in the opposite direction from that necessary to transfer load from system 10 to system 11. The stator winding of machine 12 now becomes a secondary transformer element and machine 13 becomes a motor receiving a small amount of energy from system 10 through transformer 19 and exciter 16.

I am aware that it is not novel to use an induction machine as a variable frequency transformer. However, I believe it to be novel to use such a transformer between two different power systems and provide synchronous regulating means therefor for varying the magnitude of the load in such a way that the regulation is independent of variations in the frequency relation between the two systems. I do not wish to limit my invention to the particular arrangement of the regulating apparatus herein illustrated and described since it will be evident to those skilled in the art that there are various arrangements by which an excitation proportional to the difference of two independent frequencies may be obtained.

What I claim as new and desire to secure by Letters Patent of the United States is:

1. Variable frequency changer apparatus comprising a rotary transformer having relatively rotatable alternating current windings, a synchronous dynamo electric machine directly connected to the rotatable member of said rotary transformer, an alternating current source of excitation for said synchronous machine, and means for varying the phase angular relation of such excitation with respect to that existing in one of the windings of said transformer.

2. A pair of alternating current distribution systems subject to a relatively varying frequency relation, means for transferring power from one system to the other comprising a rotary frequency transformer having relatively rotatable alternating current windings respectively connected to said systems, a synchronous dynamo electric machine directly connected to the rotatable member of said frequency transformer, and means for exciting the alternating current winding of said synchronous machine with alternating current having a frequency proportional to the difference between the frequencies of the two systems.

3. A pair of independent alternating current distribution systems, means for transferring power between said systems comprising a rotary frequency transformer having relatively rotatable alternating current windings respectively connected to said systems, a synchronous dynamo electric machine for producing relative rotation between said windings, means for exciting the alternating current winding of said synchronous machine with alternating currents at a frequency proportional to the difference in the frequencies of said two systems, and means for adjusting the phase angular relation of such alternating current excitation with respect to that of one of said systems.

4. A pair of alternating current distribution systems subject to a relatively varying frequency relation means for transferring power from one system to the other comprising a rotary frequency transformer having relatively rotatable alternating current windings respectively connected to said systems, a synchronous dynamo electric machine for producing relative rotation between the windings of said frequency transformer, a frequency converter for supplying excitation to the alternating current winding of said synchronous machine, said frequency converter being driven at a speed proportional to the frequency of one of said systems and excited by alternating current at a frequency proportional to that of the other system.

5. A pair of alternating current distribution systems subject to a relatively varying frequency relation, means for transferring power in varying amounts and in either direction between said systems comprising a rotary frequency transformer having relatively rotatable alternating current windings respectively connected to said systems, a synchronous dynamo electric machine for producing relative rotation between the windings of said frequency transformer, a frequency converter for supplying excitation to the alternating current winding of said synchronous machine, means for driving said frequency converter at a speed proportional to the frequency of one of said systems, means for exciting said frequency converter with alternating current the frequency of which varies in proportion to that of the other of said systems, and means for adjusting the phase angular relation of the alternating current excitation supplied to said synchronous machine with respect to that of said other system.

6. A pair of independent alternating current distribution systems, means for transferring energy between said systems comprising a rotary frequency transformer having relatively rotatable alternating current windings respectively connected to said systems, a synchronous dynamo electric machine for producing relative rotation between said windings, a commutator machine for furnishing alternating current excitation to the alternating current winding of said synchronous machine, said commutator machine being excited from one of said systems and driven by a synchronous motor energized from the other of said systems.

7. Apparatus for transferring energy between two independent alternating power systems according to claim 6, characterized by the provision of means for varying the phase angular relation of the alternating current excitation supplied through the commutator machine between the system from which it is supplied and the synchronous dynamo electric machine to which it is supplied.

In witness whereof, I have hereunto set my hand this fourteenth day of March, 1925.

GEORGE H. JUMP.